G. P. ALTENBERG & F. BOEHM.
DOUBLE WALLED VESSEL.
APPLICATION FILED APR. 30, 1908.
991,410.
Patented May 2, 1911.
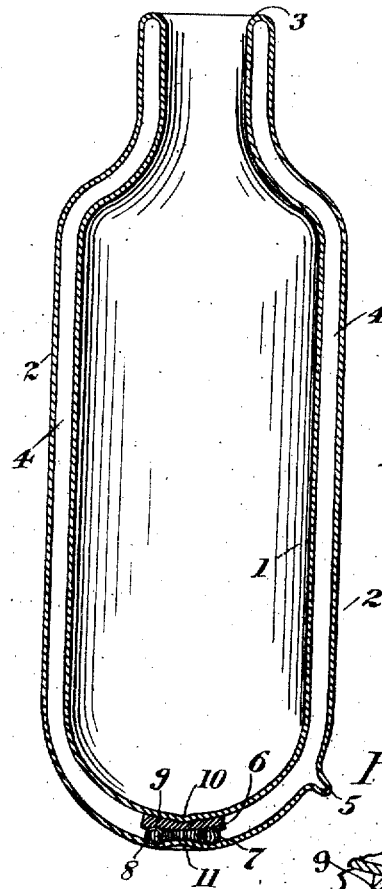
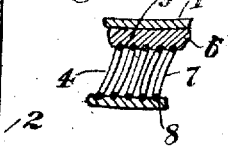
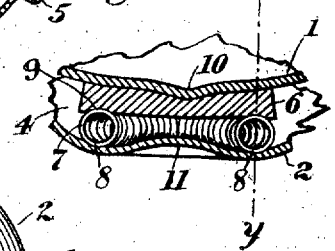
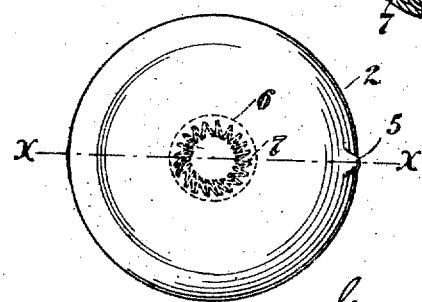
Witnesses
Inventors
George P. Altenberg
Franz Boehm
Attorney

UNITED STATES PATENT OFFICE.

GEORGE P. ALTENBERG AND FRANZ BOEHM, OF CINCINNATI, OHIO; SAID BOEHM ASSIGNOR TO SAID ALTENBERG.

DOUBLE-WALLED VESSEL.

991,410. Specification of Letters Patent. Patented May 2, 1911.

Application filed April 30, 1908. Serial No. 430,167.

*To all whom it may concern:*

Be it known that we, GEORGE P. ALTENBERG and FRANZ BOEHM, respectively a citizen of the United States of America and a subject of the Emperor of Germany, residing at Cincinnati, in the county of Hamilton and State of Ohio, have jointly invented certain new and useful Improvements in Double-Walled Vessels, of which the following is a specification.

It is the object of our invention to provide a double walled vessel comprising an inner member and an outer member connected at the mouth of said vessel, and new and improved means for separating or supporting said members from each other, and the invention will be readily understood from the following description and claims, and from the drawing, in which latter:

Figure 1 is a central vertical longitudinal section of our improved device on the line $x$—$x$ of Fig. 2. Fig. 2 is a bottom view of the same. Fig. 3 is an enlarged detail of the bottom of the vessel, in section on the line $x$—$x$ of Fig. 2; and, Fig. 4 is a similar detail in section on a line corresponding to the line $y$—$y$ of Fig. 3.

1 represents the inner member of the vessel and 2 the outer member thereof which are connected at the mouth 3 of the vessel for forming a space 4 between said members. The vessel is preferably formed of glass. The space surrounds the inner member of the vessel. This space is a heat-insulating space, and the air in it is preferably withdrawn or practically exhausted for forming a vacuum. The air may be withdrawn through a nipple 5 which is afterward sealed. The wall of the space may also be provided with suitable silvering solution. Between the bottoms of the members we provide a cushion adapted to form a support between said members preferably both in vertical direction and also laterally so that the members of said vessel may be supported from each other. This cushion we prefer to form of a block 6 of preferably heat-insulating material, for instance, asbestos or other suitable material, against which a coil-separator 7, preferably in spiral form, is cushioned. This coil-separator is preferably arranged about the longitudinal axis of the vessel. It is preferably composed of a material around which glass can be formed or fused, and we have found copper a suitable material for the purpose, although platinum or other material having substantially similar properties may be employed. We prefer to present the sides of the coils of the coil-separator toward the members of which the vessel is composed, and the coils may lean slightly as shown in Fig. 4 for affording additional cushioning effect. We also prefer that the sides of the coils adjacent one of the members shall contact that member, and when so contacting, shall be slightly embedded in the wall of said member, as shown at 8, for definitely positioning said coil-separator. This embedding is accomplished by locally heating the glass and forcing it about the sides of the coils in plastic state. The cushion-block may also be received in the interstices between the coils of the coil-separator, as shown at 9. If desired the bottom of the inner member may be provided with an indentation 10 received into the cushion-block, and the bottom of the outer member be provided with an indentation 11 about which the coil-separator is arranged. We prefer to arrange the coil-separator in the space between the members of the vessel about the longitudinal axis of the vessel, with the sides of the coils of the coil-separator presented toward the inside walls of said members.

Having thus fully described our invention what we claim as new and desire to secure by Letters Patent is:

1. A double walled vessel comprising in combination an inner member and an outer member connected at the mouth of said vessel and having heat-insulating space between said members, and a coil-separator and cushioning block therefor between the bottoms of said members in said space.

2. A double walled vessel comprising in combination an inner member and an outer member connected at the mouth of said vessel and having heat-insulating space between said members, and a spiral separator and cushioning block therefor between the bottoms of said members in said space surrounding the longitudinal axes of said members.

3. A double walled vessel comprising in combination an inner member and an outer member having a heat-insulating space therebetween, and a spiral separator in said space between said members arranged with the sides of the spirals thereof presented toward said members and said spirals being out of parallel planes, with the longitudinal axis of said vessel, substantially as shown and described.

4. A double walled glass vessel comprising in combination an inner member and an outer member having a heat-insulating space therebetween, a coil-separator and a block-cushion therefor in said space between said members, said coil-separator having the sides of the coils thereof presented toward said members and arranged about the longitudinal axis of said vessel, with said coils embedded in the glass of said vessel, substantially as described.

5. A double walled glass vessel comprising in combination an inner member and an outer member having a heat-insulating space therebetween, a coil-separator and a cushion therefor in said space between said members, said coil-separator having the sides of the coils thereof presented toward said members and arranged about the longitudinal axis of said vessel, with one side of the coils of said coil-separator embedded in the glass of said vessel and said cushion received in the interstices between said coils at the other side thereof.

6. A double walled vessel comprising in combination an inner member and an outer member having a heat-insulating space therebetween, and a spiral-separator and a cushion-block therefor in said space between said members, one of said members having an indentation, said spiral-separator having the sides of the spirals thereof presented toward said members and arranged about said indentation.

7. A double walled vessel comprising in combination an inner member and an outer member having a heat-insulating space therebetween, a coil-separator and a cushion therefor in said space between said members, said coil-separator having the sides of the coils thereof presented toward said members and arranged about the longitudinal axis of said vessel with the coils of said coil-separator embedded in said cushion.

8. A double-walled vessel comprising in combination an inner member and an outer member connected at the mouth of said vessel and having heat-insulating space between said members, and a coil-separator and cushioning block therefor between said members, the coils of said coil-separator being presented sidewise to said cushioning block.

In testimony whereof, we have subscribed our names hereto in the presence of two subscribing witnesses.

GEORGE P. ALTENBERG.
FRANZ BOEHM.

Witnesses:
EARLE R. PASSEL,
FLORENCE QUINN.